UNITED STATES PATENT OFFICE.

CHARLES E. BROWN, OF EAU CLAIRE, WISCONSIN, ASSIGNOR OF ONE-THIRD TO H. B. WALMSLEY, OF SAME PLACE.

PAINT.

SPECIFICATION forming part of Letters Patent No. 319,951, dated June 16, 1885.

Application filed October 20, 1884. (No specimens.)

*To all whom it may concern:*

Be it known that I, CHARLES E. BROWN, a citizen of the United States, and a resident of the city of Eau Claire, in the county of Eau Claire, in the State of Wisconsin, have invented a new and useful Composition of Matter to be Used as a Fire-Proof and Water-Proof Paint, of which the following is a specification.

My composition consists of the following ingredients, combined in the proportions here following, for one barrel thereof, viz: white glue, eight pounds; dark glue, ten pounds; alum, seven pounds. These three ingredients are to be thoroughly stirred in and mixed with twelve gallons of cold coal-tar and the mixture allowed to stand from six to eight hours. Then add to said mixture coarse salt, nine pounds; red iron ore, fourteen pounds; Green Bay umber, ten pounds; yellow ocher, ten pounds, and stir the four last-mentioned ingredients thoroughly into the mixture. Take a sufficient quantity of coal-tar and heat it to the boiling-point. Then add and thoroughly stir into said mixture the boiling tar in the proportion of from three to four quarts of the mixture to twelve quarts of the boiling tar, and keep it boiling until thoroughly stirred and mixed, viz., from ten to twenty minutes. To be used hot.

For painting tin and iron the ingredients of the second group above—to wit, the coarse salt, Green Bay umber, red iron ore, and yellow ocher—should be used in quantities only one-half of those aforesaid, because for such work the quantities first above specified of said last-mentioned ingredients make a heavier coat than is necessary or desirable. For work where it is desirable that the paint should fill up many cracks and holes—as upon a very bad shingle-roof, for instance—the proportions above given of glue, alum, iron ore, ocher, and umber may be increased with advantage.

What I claim, and desire to secure by Letters Patent of the United States, is—

The herein-described composition of matter to be used as a general fire-proof and water-proof paint, consisting of white glue, dark glue, alum, salt, red iron ore, Green Bay umber, yellow ocher, and coal-tar, in the proportions specified.

CHARLES E. BROWN.

Witnesses:
CHARLES GRAY,
M. GRIFFIN.